United States Patent [19]
Goulden et al.

[11] Patent Number: 5,956,025
[45] Date of Patent: Sep. 21, 1999

[54] REMOTE WITH 3D ORGANIZED GUI FOR A HOME ENTERTAINMENT SYSTEM

[75] Inventors: Lorna Goulden, Eindhoven, Netherlands; Jeffrey Alan Herman, Palo Alto, Calif.; Paul S. Moore, Eindhoven, Netherlands

[73] Assignee: Philips Electronics North America Corporation, New York, N.Y.

[21] Appl. No.: 08/871,082

[22] Filed: Jun. 6, 1997

[51] Int. Cl.[6] .................................................... G06F 3/00
[52] U.S. Cl. ......................... 345/327; 345/169; 345/353; 345/355; 345/357; 345/341; 345/970; 345/976; 364/188; 348/734
[58] Field of Search ..................................... 345/326–358, 345/173–183, 169, 970, 976; 348/7, 12, 13, 734; 364/188

[56] References Cited

U.S. PATENT DOCUMENTS

| | | | |
|---|---|---|---|
| 4,712,191 | 12/1987 | Penna | 345/353 |
| 4,763,356 | 8/1988 | Day, Jr. et al. | 345/173 X |
| 5,038,401 | 8/1991 | Inotsume | 348/734 X |
| 5,327,160 | 7/1994 | Asher | 345/156 |
| 5,367,316 | 11/1994 | Ikezaki | 348/734 X |
| 5,383,044 | 1/1995 | Borchardt et al. | 345/173 X |
| 5,410,326 | 4/1995 | Goldstein | 348/734 X |
| 5,500,794 | 3/1996 | Fujita et al. | 364/188 |
| 5,524,195 | 6/1996 | Clanton, III et al. | 345/327 |
| 5,545,857 | 8/1996 | Lee et al. | 345/173 X |
| 5,598,523 | 1/1997 | Fujita | 345/352 |
| 5,646,608 | 7/1997 | Shintani | 340/825.52 |
| 5,689,663 | 11/1997 | Williams | 345/327 |
| 5,704,051 | 12/1997 | Lane et al. | 345/353 X |
| 5,764,179 | 6/1998 | Tsurumoto | 345/173 X |
| 5,793,366 | 8/1998 | Mano et al. | 345/329 |

Primary Examiner—John E. Breene
Attorney, Agent, or Firm—Peter Verdonk

[57] ABSTRACT

A remote control device for a home entertainment system has a GUI with touch screen functionality. The visible part of the GUI is hierarchically organized in several control levels. All levels have consistent lay-outs with a first area for selectable items in a first location, a second area with controls for the selected one of the items in a second location and a third area for content data relating to the selected item in a third location. The spatial relationship between locations and areas is maintained throughout the levels. Such a GUI contributes significantly to the user-friendliness of the home entertainment system.

16 Claims, 6 Drawing Sheets

220: BAND WITH GRAPHICAL REPRESENTATIONS OF BASIC INFORMATION PANELS;
222: BAND WITH GRAPHICAL REPRESENTATIONS OF BASIC CONTROLS;
224: RACK WITH LINEAR ORGANIZATION OF GRAPHICAL REPRESENTATIONS OF SELECTABLE ITEMS IN LAYER 202;
802: ARROW ICON FOR ACTIVATING PANEL 252 IN FIG. 2;
806: RETURN SOFT-KEY FOR RETURNING TO HOME LEVEL.

120: HARD KEY;
118: CONTROL DEVICE

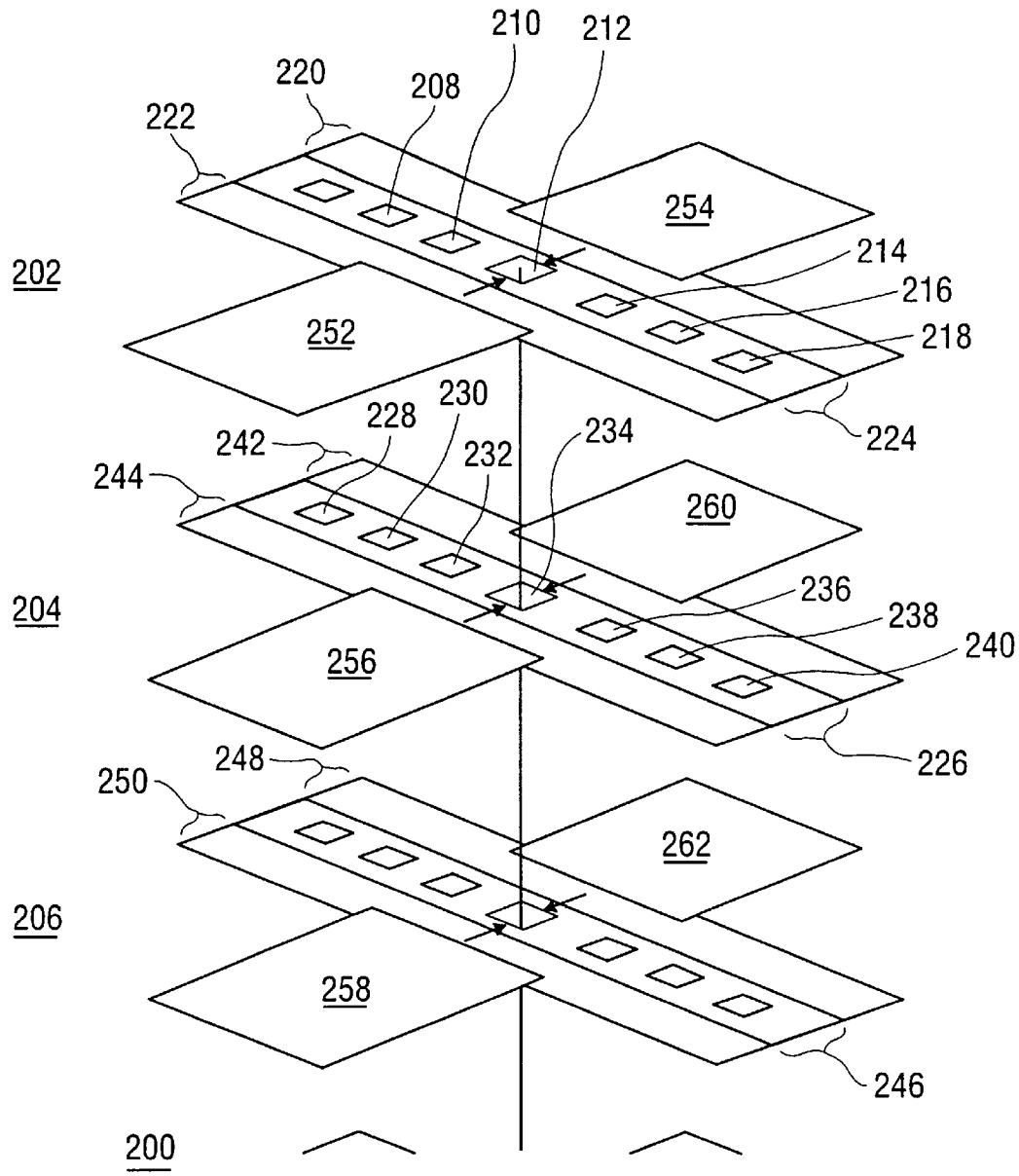

202, 204, 206: LAYERS IN HIERARCHY;
208, 210, 212, 214, 216, 218: GRAPHICAL REPRESENTATIONS OF SELECTABLE ITEMS IN LAYER 202;
228, 230, 232, 234, 236, 238, 240: GRAPHICAL REPRESENTATIONS OF SELECTABLE ITEMS IN LAYER 204;
220, 242, 248: BANDS WITH GRAPHICAL REPRESENTATIONS OF BASIC INFORMATION PANELS;
222, 244, 250: BANDS WITH GRAPHICAL REPRESENTATIONS OF BASIC CONTROLS;
224, 226, 246: RACKS WITH LINEAR ORGANIZATION OF GRAPHICAL REPRESENTATIONS OF SELECTABLE ITEMS IN LAYER 202, 204 AND 206, RESPECTIVELY;
252, 256, 258: SUPPLEMENTARY PANELS FOR SUPPLEMENTARY CONTROLS;
254, 260, 262: SUPPLEMENTARY PANELS FOR SUPPLEMENTARY INFORMATION;

FIG. 2

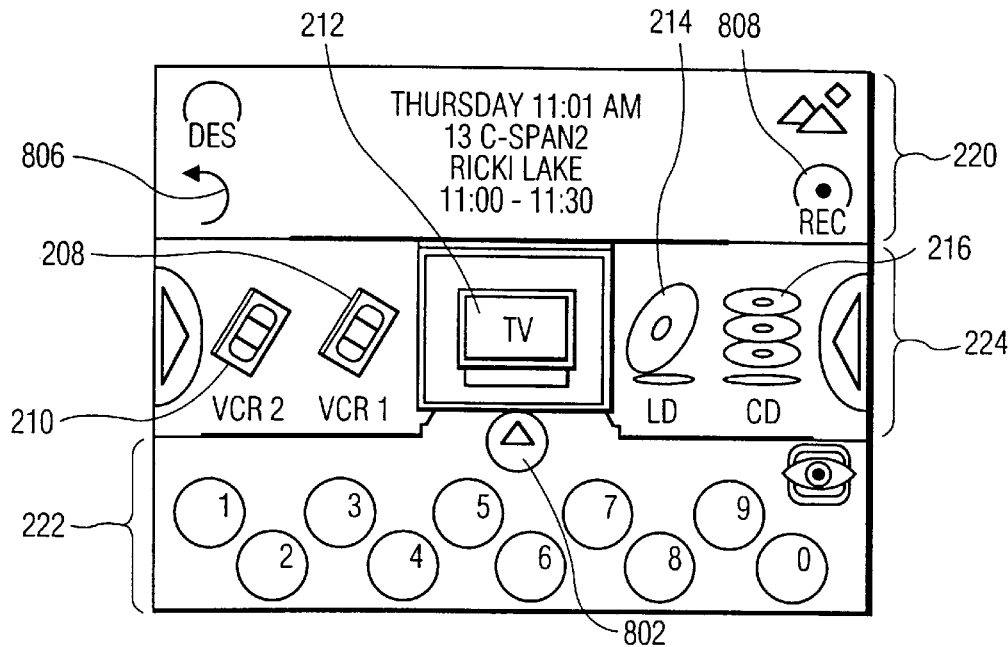

220: BAND WITH GRAPHICAL REPRESENTATIONS OF BASIC INFORMATION PANELS;
222: BAND WITH GRAPHICAL REPRESENTATIONS OF BASIC CONTROLS;
224: RACK WITH LINEAR ORGANIZATION OF GRAPHICAL REPRESENTATIONS OF SELECTABLE ITEMS IN LAYER 202;
802: ARROW ICON FOR ACTIVATING PANEL 252 IN FIG. 2;
806: RETURN SOFT-KEY FOR RETURNING TO HOME LEVEL.

FIG. 3

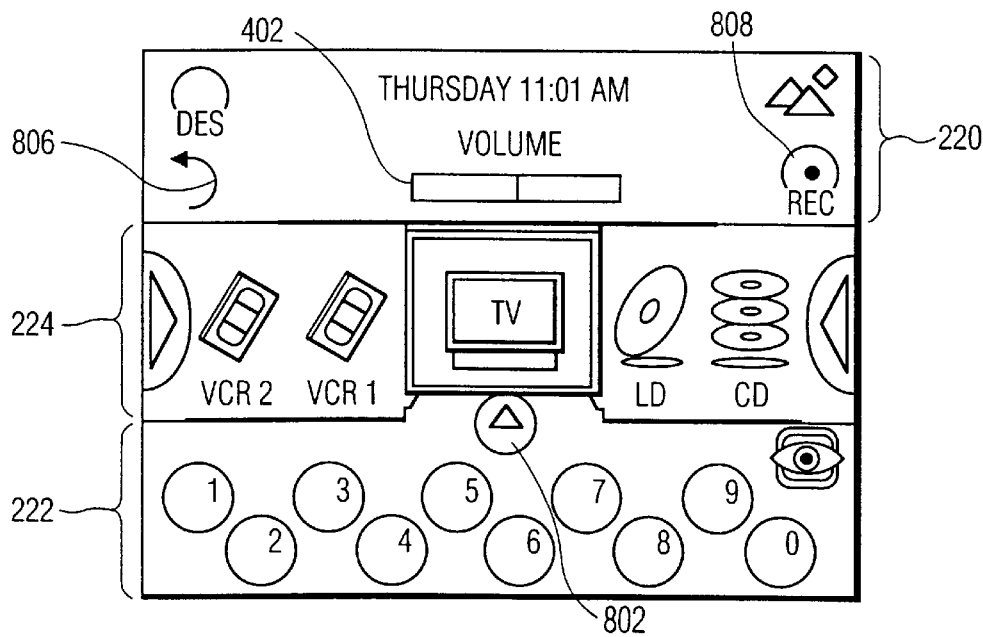

220: BAND WITH GRAPHICAL REPRESENTATIONS OF BASIC INFORMATION PANELS;
222: BAND WITH GRAPHICAL REPRESENTATIONS OF BASIC CONTROLS;
224: RACK WITH LINEAR ORGANIZATION OF GRAPHICAL REPRESENTATIONS OF SELECTABLE ITEMS IN LAYER 202;
802: ARROW ICON FOR ACTIVATING PANEL 252 IN FIG. 2;
806: RETURN SOFT-KEY FOR RETURNING TO HOME LEVEL.

FIG. 4

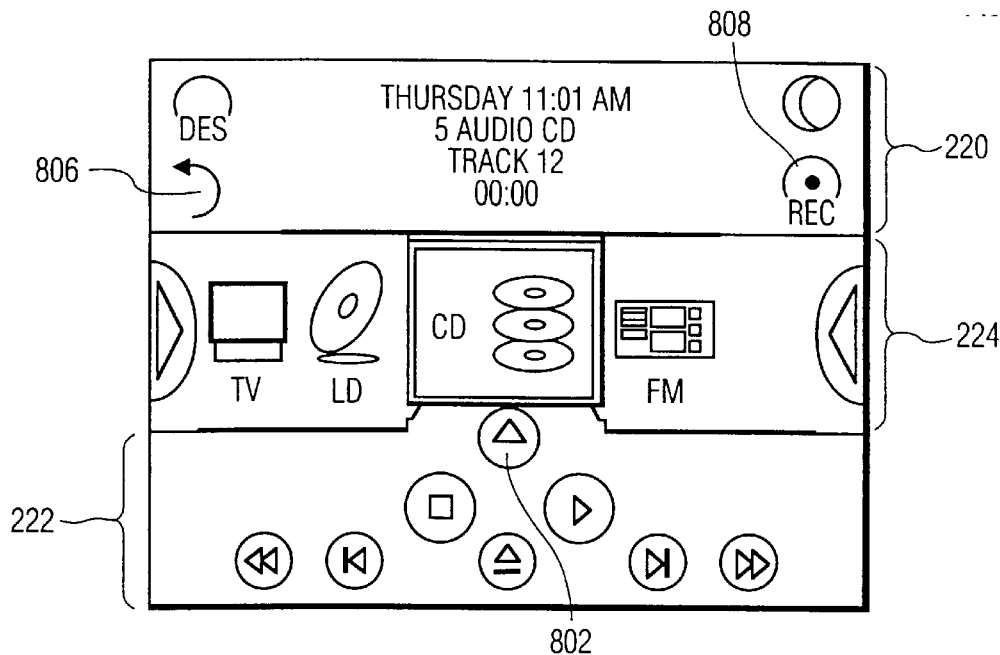

220: BAND WITH GRAPHICAL REPRESENTATIONS OF BASIC INFORMATION PANELS;
222: BAND WITH GRAPHICAL REPRESENTATIONS OF BASIC CONTROLS;
224: RACK WITH LINEAR ORGANIZATION OF GRAPHICAL REPRESENTATIONS OF SELECTABLE ITEMS IN LAYER 202;
802: ARROW ICON FOR ACTIVATING PANEL 252 IN FIG. 2;
806: RETURN SOFT-KEY FOR RETURNING TO HOME LEVEL.

FIG. 5

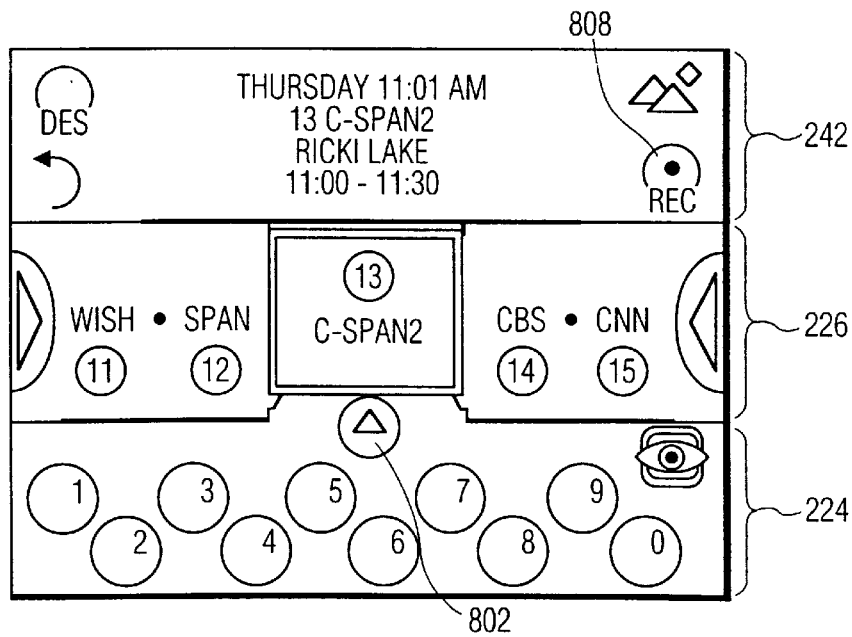

226: RACK WITH LINEAR ORGANIZATION OF GRAPHICAL REPRESENTATIONS OF SELECTABLE ITEMS IN LAYER 204 OF FIG. 2;
242: BAND WITH GRAPHICAL REPRESENTATIONS OF BASIC INFORMATION PANELS;
244: BAND WITH GRAPHICAL REPRESENTATIONS OF BASIC CONTROLS;
802: ARROW ICON FOR ACTIVATING PANEL 256 IN FIG. 2;
806: RETURN SOFT-KEY FOR RETURNING TO HOME LEVEL.

FIG. 6

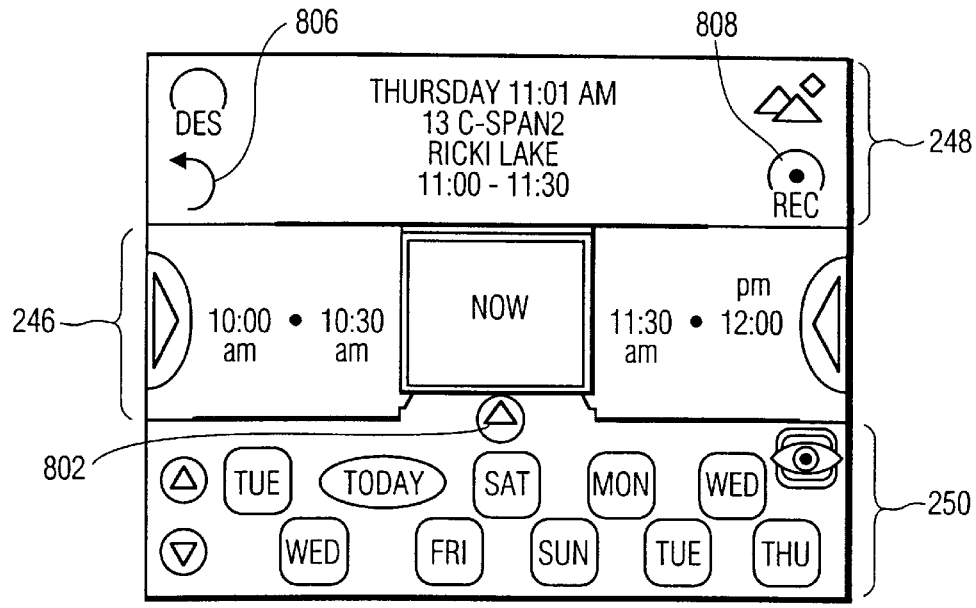

246: RACK WITH LINEAR ORGANIZATION OF GRAPHICAL REPRESENTATIONS OF SELECTABLE ITEMS IN LAYER 206;
248: BAND WITH GRAPHICAL REPRESENTATIONS OF BASIC INFORMATION PANELS;
250: BAND WITH GRAPHICAL REPRESENTATIONS OF BASIC CONTROLS;
802: ARROW ICON FOR ACTIVATING PANEL 258 IN FIG. 2;
806: RETURN SOFT-KEY FOR RETURNING TO HOME LEVEL.

FIG. 7

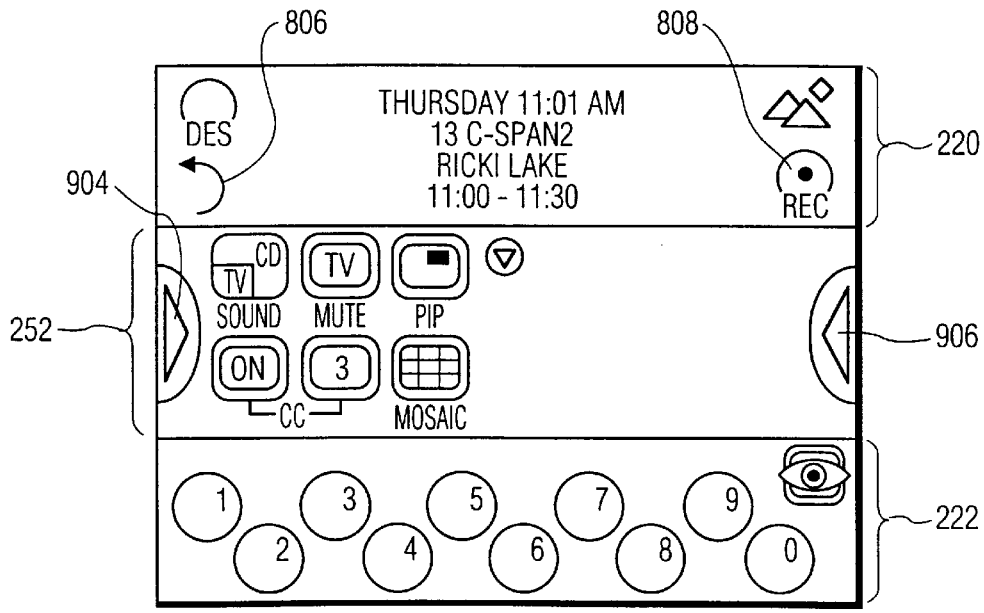

220: BAND WITH GRAPHICAL REPRESENTATIONS OF BASIC INFORMATION PANELS;
222: BAND WITH GRAPHICAL REPRESENTATIONS OF BASIC CONTROLS;
252: SUPPLEMENTARY PANEL FOR SUPPLEMENTARY CONTROLS;
806: RETURN SOFT-KEY FOR RETURNING TO HOME LEVEL.
904, 906: SCROLL BUTTONS.

FIG. 8

222: BAND WITH GRAPHICAL REPRESENTATIONS OF BASIC CONTROLS;
806: RETURN SOFT-KEY FOR RETURNING TO HOME LEVEL;
902: OK ICON APPEARING UPON ACTIVATING RECORD KEY 808;
904, 906: SCOLL BUTTONS.

REMOTE WITH 3D ORGANIZED GUI FOR A HOME ENTERTAINMENT SYSTEM

FIELD OF THE INVENTION

The invention relates to a consumer electronics system with a plurality of user-selectable and user-controllable functionalities. The functionalities are distributed over multiple control levels. The system comprises a display for displaying a graphical user interface (GUI), and a controller coupled to the display for enabling a user to control the system through the GUI.

BACKGROUND ART

Icons are well known in the art of graphical user-interfaces for control of an information processing system. An icon is a small pictorial representation of some larger set of information. An icon provides graphical information in a condensed format about contents or status of the underlying system. Icons are designed to trigger, through visual perception, operator concepts that communicate the contents or operation of the system in a quick manner. The system is accessed or operated upon through actuation of the icon.

An example of a controller unit for a home entertainment system is the Stage 3 Controller unit of Kenwood, described in Kenwood's publicly available manual "STAGE 3/Setting up your KC-Z1 Controller", 1996. The control unit includes a hand-held controller with a touch screen functionality for the GUI. The GUI provides a large number of icons that correspond to a large number of system functionalities. The functionalities are activated through the icons on the touch screen. The GUI is user-programmable to select the icons that should be present in the main menu and those that should not. In addition, the control modes (e.g., IR control codes, balancing audio speaker system) of the components thus selected can be programmed.

Icons in general are meant to convey information to the user in a quick manner through an appropriate graphical representation. However, if a large number of icons are presented at any of a variety of levels in a hierarchy of icons, the user has to actually read, i.e., decipher, the screen's information content to locate the desired functionality. As a result, the user-friendliness of the system control aspects can easily be degraded if too much information is presented in too many different icon-arrangements. A drawback of the prior art control unit discussed above is the inconsistency regarding the locations of the icons that require the user to actually study and decipher the menu items displayed, in order to find the desired functionality.

OBJECT OF THE INVENTION

It is an object of the invention to provide a more user-friendly GUI for control of a home entertainment system.

SUMMARY OF THE INVENTION

To this end, the invention provides a consumer electronics system with a plurality of user-selectable and user-controllable functionalities distributed over multiple levels in a control hierarchy. The system comprises a display for displaying a GUI. The system comprises a controller for enabling a user to control the system through the GUI. The GUI provides a respective lay-out for each respective one of the multiple control levels. Each respective one of the lay-outs provides, in a first area of the display, first graphical representations of functionalities selectable at the respective level. In a second area of the display, the lay-out provides second graphical representations of basic controls for controlling a selected one of the functionalities. The first and second areas stay in their respective locations on the display throughout the multiple levels. Preferably, each respective one of the lay-outs also provides, in a third area of the display, a third graphical representation of content data relevant to the selected functionality. The third area keeps its location on the display throughout the multiple levels as well, thus conserving to the uniformity of the lay-outs throughout the levels for selectability, controllability and content data.

The lay-out in the invention is thus made spatially uniformly consistent throughout the levels of the control hierarchy. This ergonomic design of the GUI lets the user easily find specific selectable and controllable items owing to the spatial clustering of graphical representations according to the type of their functionality: selection, control or content data.

BRIEF DESCRIPTION OF THE DRAWINGS

The invention is explained in further detail by way of example and with reference to the accompanying drawings, wherein:

FIG. 2 is a diagram explaining the 3D-organization of the graphics user information;

FIGS. 3–9 are diagrams of the controller's display showing the arrangements of graphics user information at various stages of control of the system.

Throughout the figures, same reference numerals indicate similar or corresponding features.

DETAILED EMBODIMENTS

First, the system according to the invention is described below. Then, the three-dimensional organization of the GUI is explained.

Figure 1:
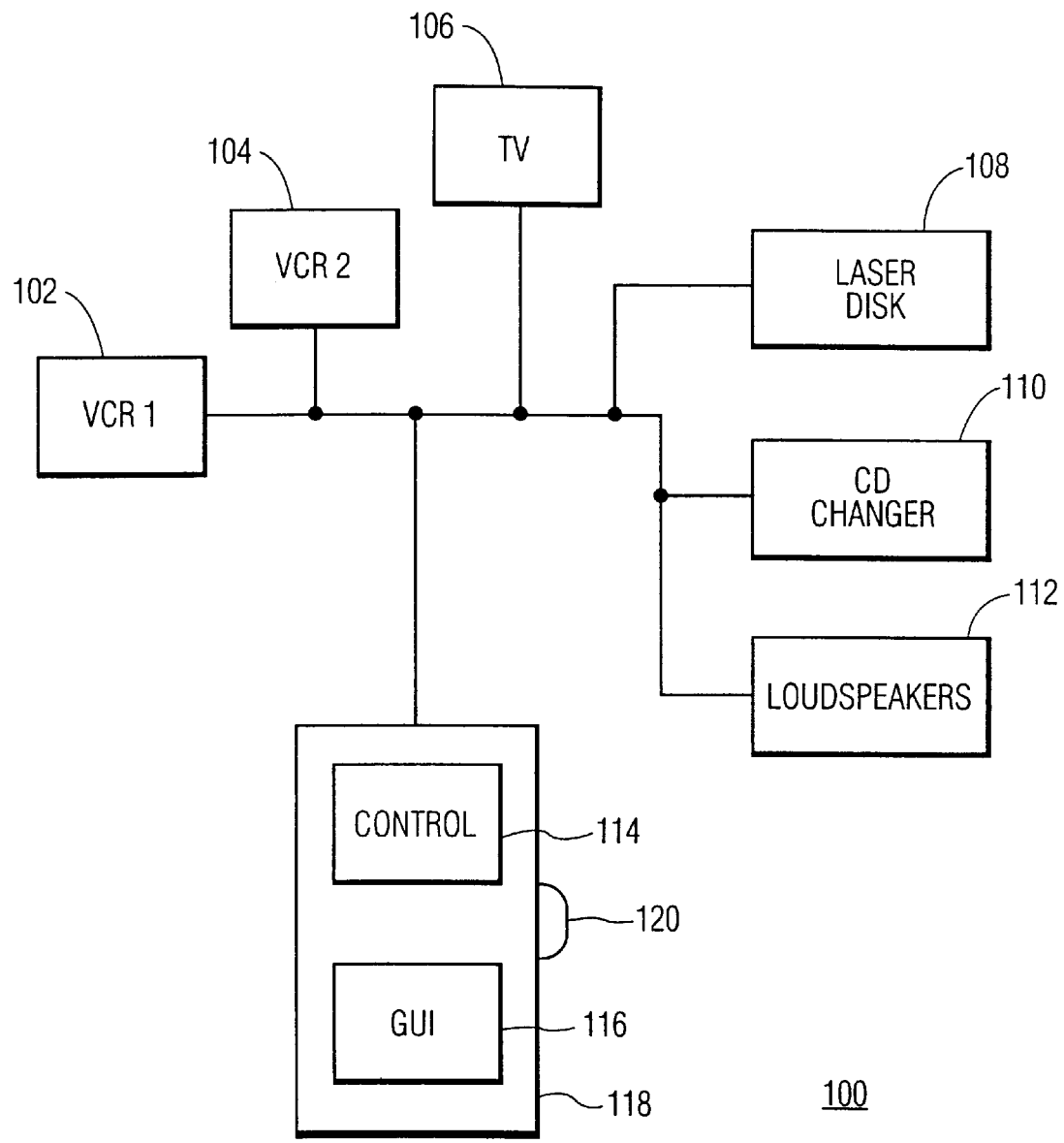
FIG. 1 is a block diagram of a system according to the invention.

FIG. 1 is a block diagram of a system 100 according to the invention. In this example, system 100 is a home entertainment system that comprises multiple top-level sub-systems 102, 104, 106, 108, . . . , 112 with functionalities that relate to the processing audio and video data. Sub-system 102 includes a first VCR. Sub-system 104 includes a second VCR. Sub-system 106 includes a television set with monitor and with a cable or satellite TV-tuner. Sub-system 108 includes a laser disk player. Sub-system 110 includes a CD-changer. Sub-system 112 comprises a surround-sound digital loudspeaker arrangement. Each of sub-systems 102–112 is composed of two or more lower-level sub-systems that are discussed further below. In this example, sub-systems 102–112 are coupled to one another in order to have them cooperate with one another in a controllable fashion. For example, the audio information received through the tuner in TV 106 can be routed to loudspeaker arrangement 112 through some routing system, not explained in further detail here. See, for example, U.S. patent application Ser. No. 08/731,624 (PHA 23,169) of the same Assignee, presenting a consumer electronics system, wherein electronic devices such as 102–112 are interacting through drivers that have been downloaded from the devices themselves into the control system. The advantage of this approach is that all devices can be treated uniformly at the same level by software applications that govern the interactions, e.g., of the source-destination type. Other kinds of routing systems, e.g., based on the I$^2$C protocol of Philips Electronics, can be used as well in combination with appropriate routing control devices. The present invention is concerned with the GUI aspects.

System 100 also comprises a controller 114 and a display 116. Display 116 provides a GUI. Controller 114 is coupled to display 116 for letting the user operate the selectable functionalities and controllable functionalities of system 100 through the GUI. Controller 114 and display 116 are functionally and physically integrated in a hand-held remote control device 118. Display 114 has a touch-sensitive functionality, referred to as "touch screen", in order to let the user control system 100 by touching the screen at appropriate screen locations. Other top-level sub-systems (not shown) may include, a cassette deck, a radio tuner, a climate control system, an artificial lighting control system, a camera-based security system, etc. Control device 118 has a hard key 120 in order to facilitate sound volume control of one or more of sub-systems 102–112 in case the sound has to be turned low immediately, e.g., in an emergency when the initial setting upon activating one of the devices 102–112 has an audio functionality and produces a sound that is much too loud upon switching it on. Control device 118 may have additional hard keys (not shown) for controlling other system functionalities, e.g., channel-up/down.

FIG. 2 is a diagram of the lay-out of the graphics information provided by the GUI at display 116. The GUI is organized as a hierarchy of layers 202, 204, . . . , 206, . . . Each of layers 202–206 comprises icons for selectable sub-systems at the associated level, icons for the corresponding basic controls, and content data information for the associated level. A next one among layers 202–206 is accessible through selecting an icon in the preceding layer.

Top layer 202 comprises graphical representations 208, 210, 212, 214, 216 and 218 for selectable items, i.e., sub-systems 102–112. Top layer 202 comprises a band 220 with graphical representations of basic information panels (no details here) with content data relating to the available ones of items 102–112, and a band 222 with graphical representations (no details here) of basic controls for each of items 102–112.

Graphical representations 208–218 of the selectable items are arranged linearly as in a rack 224. Graphical representation 212 of the selected item, e.g., television receiver 106, is located at the center of rack 224. Graphical representation 212 of the selected item in the center is preferably represented in a manner that visually contrasts with the representations of the non-selected items. For example, the selected item may be graphically represented by an icon that is larger than the icons for the non-selected items in rack 224, thus suggesting a sense of depth. Alternatively, or supplementary, the icon of the selected item is shown against a background that is colored or shaded differently from that for the non-selected items, or it is made to flash, etc.

The user selects a particular one among items 208–218 in rack 224 by touching display 116 at the corresponding location. Rack 224 then spins to put the selected item at the center of the visible portion of rack 224. The displayed portion of basic contents information band 220 and basic controls band 222 then change accordingly. Alternatively, the user touches and holds a scroll button at display 116 to move rack 224 in a particular direction until the desired selectable item is at the center. In the latter case, rack 224 has fixed end points. These fixed end points may make it easier to remember the location of items 102–112 on rack 224, and prevent the user from overshooting the end of the rack. The graphical representation of the most commonly used ones of selectable items 208–218 (e.g., the one that represents TV tuner 106) is located at the center of the complete rack 224 by default. Preferably, the user has the option of re-arranging this default configuration by programming controller 114, e.g., to match the physical location of sub-systems 102–112 in his/her room.

Rack 224 with graphical representations 208–218 of the selectable items, basic information band 220 and basic controls band 222 lie in the same plane. Basic information band 220 in this example is arranged between device rack 224 and the top of the screen of display 116, and basic controls band 222 is arranged between device rack 224 and the bottom of the screen. Band 220 will thus not be blocked from view by the user when he/she is manipulating the basic controls in band 222.

Next lower level 204 is reached through top level 202 by activating, in this example: touching, icon 212 that is currently located in center of the visible portion of rack 224. Next lower level 204 has a similar lay-out as layer 202. That is, layer 204 comprises a rack 226 of selectable items 228–240 flanked by a basic information band 242 and a basic controls band 244 in a configuration similar to the one of layer 202 as discussed above. Selection of a particular one of items 228–240 is done in a similar manner as discussed with reference to top layer 202. The displayed portions of basic information band 242 and basic controls band 244 change accordingly. Getting back to the next higher layer is achieved through a return icon that is uniform for all lower levels 204, . . . , 206. The relationship between layer 202 and layer 204 is explained in more detail below, in the case the passage is made through selecting icon 212 in the center rack 224. Icon 212 stands for one of top-level sub-system 102–112. Each of top-level sub-systems 102–112 is composed of multiple lower-level sub-systems, also referred to as functionalities throughout this text. Layer 204 emerges when icon 212 in layer 202 is activated. Layer 204 now displays selectable items 228–240 that represent lower-level sub-systems of the top-level sub-system represented by icon 212. In this example, the top-level sub-system is TV receiver 106 and, here, its corresponding sub-systems are the tunings to the available TV channels. If icon 212 had represented CD-changer 110, sub-systems 228–240 would be the representations of the available CD's stored.

Next lower levels such as level 206 have a lay-out similar to that of level 202 or 204.

Control level 202 provides supplementary panels 252 and 254 that are made to appear to slide from the edge of display 116 over rack 224 and back again upon touching an appropriate key or icon (not shown here). Supplementary panel 252 provides supplementary controls, in addition to the basic controls in the visible portion of band 222, for the sub-system currently in the center of rack 224, i.e., sub-system 212. For TV sub-system 106 supplementary controls comprise, for example, soft keys to adjust contrast, brightness, hue, etc., keys to trigger picture-in-picture, closed captions, mosaic, etc. Supplementary panel 254 provides supplementary data content information, e.g., a text summary of the TV program currently being broadcasted on the channel that TV system 106 is tuned into. This kind of information is made available, e.g., by means of an electronic program guide (EPG). Levels 204 and 206 have similar supplementary control panels 256 and 258, respectively, and similar supplementary content data panels 260 and 262, respectively. Further details are given below.

FIG. 3 gives an example of the GUI when TV receiver 106 has been selected. Graphical representation 212 of TV receiver 106 is shown in the center of the visible portion of rack 224. Graphical representations regarding the basic information contents of TV receiver 106 is displayed in the portion of band 220 made visible on display 116: for example: its current channel and current program together with its duration, etc. All these information items can be made available through, e.g., an electronic program guide (EPG). Also, the visible portion of basic information band 220 displays the name and date of the current day and current time throughout the levels. Graphical representations for the basic controls of TV receiver 106 are being displayed in the visible portion of band 222: here ten digits for changing the channels.

FIG. 4 shows the GUI wherein information panel 220 is also used to give temporarily visual feedback to the user, e.g., when manipulating the basic controls in band 222 or hard key 120 on remote control device 118. For example, when the user is adjusting the sound volume of TV receiver 106 through hard (physical) key 120 on device 118 or via an appropriate soft key, rather than putting the visual feedback on the monitor of TV receiver 106 and degrading the viewing experience, the visual feedback appears temporarily on display 116 of remote control device 118, e.g., as a slider scale 402.

FIG. 5 illustrates the case wherein the selected item is CD-changer 110, its graphical representation 216 being shown in the visible portion of rack 224. The visible portion of basic information band 220 presents information about the current CD: for example, the disc number, type, track number, title of the track, and time elapsed. This information changes automatically when the user switches to another CD, or browses within a CD. Visible portion of basic controls band 222 now provides the basic controls of CD-changer 110: stop, play, next/previous disc, next/previous track, eject, etc.

FIG. 6 is a diagram of the GUI at next lower level 204. When the user touches graphical representation 212 of TV receiver 106 in rack 224 at level 202 as shown in the diagram of FIG. 3, the GUI animates toward next lower level 204 and appears as in FIG. 6. Rack 226 now represents as selectable items a list of TV channels identified by their names, and also by numerals displayed with each name. The soft keys in the visible portion of basic controls band 244 are now used to select one of the channels by their number, in order to have displayed in the visible portion of basic information band 242 information relating to the program being currently broadcasted at a channel, other than the one that has been selected and is displayed in the center of rack 226.

FIG. 7 is a diagram of next lower level 206 that pops up when the user touches the center of rack 226 in the GUI of FIG. 6 at level 204. Rack 246 of selectable items now shows a list of times, and the soft keys in the visible portion of basic controls band 250 provide basic controls to jump to a particular day. The visible portion of basic information band 248 displays the name of the program currently being broadcasted on the selected channel. Band 248 changes the program information according to the time selected on rack 246 and the day selected in the visible portion of basic controls band 250.

FIG. 8 is a diagram illustrating supplementary control and information panels 252 and 254, respectively. When the user touches an arrow icon 802 that is located immediately below icon 212 in FIG. 3, panel 252 rises up from basic controls band 222 and results in the diagram of FIG. 8. Rack 224 now is replaced by panel 252 of supplementary controls. The supplementary controls comprise, for example, TV controls for Closed Captions, Picture-in-Picture, Mosaic, etc. The user can scroll through other regions of TV controls on panel 252 by touching or holding left or right scroll arrows 904 and 906.

To get back to a previous level, the user has to touch a return soft key 806 that appears at each level, possibly also at top level 202 to enable returning to a home level, e.g., to play a video game on the display of the remote. Return key 806 is consistently in the same location throughout levels 202–206 and has a uniform appearance for instant recognition. See FIGS. 3–8.

Figure 9:
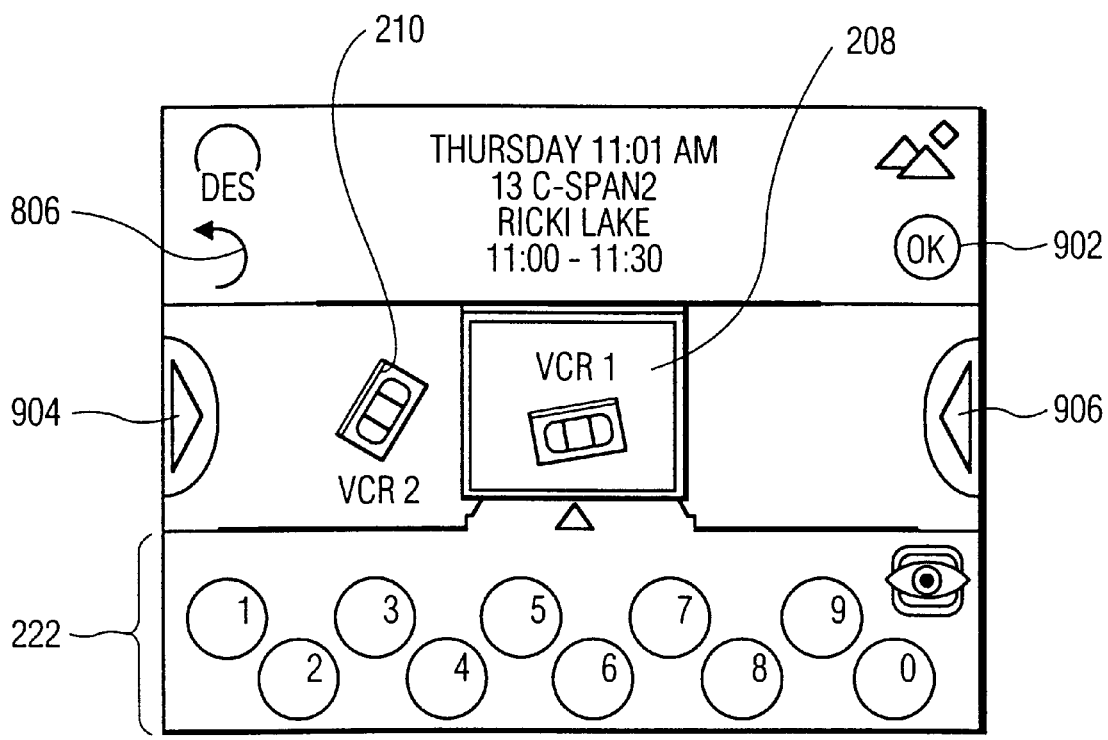

Also consistently appearing throughout control levels 202–206 is a record soft key 808. See FIGS. 3–8. Traditionally, users have controlled home entertainment systems with several remote control devices. When they wished to record some content, they would need to find the appropriate remote control device, find the record button on it, and set up the destination device to receive the recording. This holds true for both hard-button-only remote control devices and touch-screen-based remote control devices such as the one discussed in the background art section above. The invention now provides a GUI that simplifies the recording process for all sub-systems by integrating the recording function into one button, here soft-key 808, which is always available in the same location regardless of the sub-system currently selected. Some of devices 102–112 function as data source (e.g., laser disk 108), some function as data destination (e.g, loudspeaker system 112 ), some can adopt both roles (e.g., TV receiver 106, VCR's 102 and 104). When a selected one of items 208–218 or 228–240 represents a (possible) data source, touching record button 808 makes destination sources available for selection as recording devices by the user. More specifically, a user browses to the content that he/she wants to record, and then touches record button 808. The GUI then responds by automatically presenting a rack of sub-systems that he/she can record to, given the selected content to be recorded. For example, if the user touches the record button 808 in FIG. 3, the GUI changes to the one of FIG. 9. Record button 808 has changed to an "OK" icon 902. System 100 has determined that acceptable destinations are VCR's 102 and 104, given the selected content, in this case a video signal, and given the devices that are known to be present. Presence is determined by, e.g., the user pre-programming remote control device 118. Alternatively, system 100 keeps an inventory itself of what sub-systems have been plugged in. Reference is made to U.S. patent application Ser. No. 08/731,624 of same Assignee, mentioned above. Alternatively, controller 114 polls the sub-systems present and decides then which ones are candidates for the recording. Mere data sources such as laser disk sub-system 108 and an FM radio receiver (not shown) are filtered out. After the user has selected the desired one of VCR's 102 and 104, here VCR 102, through scroll buttons 904 and 906, VCR 102 is enabled. Throughout the recording operation, rack 224 indicates the status of VCR 102, e.g., with a label "R" across graphical representation 208 that says that VCR 102 is active, regardless of VCR 102 or another sub-system appears in the center of rack 224.

Another key that could be consistently located throughout the levels and that could have uniform appearance for instant recognition is a volume control soft key (not shown) that replaces or supplements hard key 120.

Above diagrams are examples only. Alternative layouts are possible. For instance, bands of selectable items 224, 226 and 246 that are shown as running horizontally across display 116 could be running vertically instead. Basic controls bands 222, 244 and 250 are then preferably located at the right hand side of vertical band 224, 226 or 246, if the user is right-handed, and at the left side of vertical band 224, 226 or 246 if the user is left-handed. A suitable programmability feature could be provided for implementing selectability. For example, a home page of the GUI, that can be reached through return button 806 at level 202 should provide a personalized entrance for each individual user, e.g., an icon with the user's name, who then can pre-program his/her preferred GUI layout.

We claim:

1. For use in a consumer electronics system with a plurality of user-selectable and user-controllable functionalities distributed over multiple levels in a control hierarchy, a hand held remote control device comprising:

a display for displaying a graphical user interface (GUI);

a controller coupled to the display for enabling a user to control the system through the GUI; wherein:

the GUI provides a respective lay-out for each respective one of the multiple control levels;

each respective one of the lay-outs provides:

in a respective first area of the display, first graphical representations of functionalities selectable at the respective level; and the respective first areas occupy a first portion of the display at substantially the same first location throughout the levels, and wherein:

each respective one of the lay-outs comprises, in a respective second area of the display, second graphical representations of basic controls for controlling a selected one of the selectable functionalities at the respective level; and the respective second areas occupy a second portion of the display at substantially the same second location, different from the first location, throughout the levels.

2. The remote control device of claim 1, wherein:

each respective one of the lay-outs provides, in a respective third area of the display, a third graphical representation of content data relevant to the selected functionality at the respected level; and the respective third areas occupy a third portion of the display at substantially the same third location, different from the first location, throughout the levels.

3. The remote control device of claim 1, wherein the respective first area comprises a band substantially across the display.

4. The remote control device of claim 1, wherein the respective first area comprises a band substantially across the display; and the respective second area is located between a side of the display and the band.

5. The remote control device of claim 4, wherein:

each respective one of the lay-outs comprises, in a respective third area of the display, third graphical representations of content data relevant to the selected functionality at the respected level;

the respective third areas occupy a third portion of the display at substantially the same third location, different from the first and second locations, throughout the levels; and the respective third area is located between another side of the display and the band.

6. The remote control device of claim 1, providing hard controls for control of a sound volume produced by an audio functionality in the system.

7. The remote control device claim 1, wherein each respective next one of the lay-outs has a further graphical representation of a return button for return to the preceding higher level, the further graphical representation being uniform throughout the levels with regard to location and appearance.

8. The remote control device of claim 1, wherein each respective lay-out has a further graphical representation of a selectable record button that enables recording upon selection of a recording functionality in the system and that is uniform throughout the levels with regard to location and appearance.

9. A consumer electronics system with a plurality of user-selectable and user-controllable functionalities distributed over multiple levels in a control hierarchy, the system comprising a control device for user-control of the system, the system comprising:

a display for displaying a graphical user interface (GUI);

a controller coupled to the display for enabling a user to control the system through the GUI; wherein:

the GUI provides a respective lay-out for each respective one of the multiple control levels;

each respective one of the lay-outs provides:

in a respective first area of the display, first graphical representations of functionalities selectable at the respective level; and the respective first areas occupy a first portion of the display at substantially the same first location throughout the levels and wherein:

each respective one of the lay-outs comprises, in a respective second area of the display, second graphical representations of basic controls for controlling a selected one of the selectable functionalities at the respective level; and the respective second areas occupy a second portion of the display at substantially the same second location, different from the first location, throughout the levels.

10. The system of claim 9, wherein:

each respective one of the lay-outs provides, in a respective third area of the display, a third graphical representation of content data relevant to the selected functionality at the respected level; and the respective third areas occupy a third portion of the display at substantially the same third location, different from the first location, throughout the levels.

11. The system of claim 9, wherein the respective first area comprises a band substantially across the display.

12. The system of claim 9, wherein the respective first area comprises a band substantially across the display; and the respective second area is located between a side of the display and the band.

13. The system of claim 12, wherein:

each respective one of the lay-outs comprises, in a respective third area of the display, third graphical representations of content data relevant to the selected functionality at the respected level;

the respective third areas occupy a third portion of the display at substantially the same third location, different from the first and second locations, throughout the levels; and the respective third area is located between another side of the display and the band.

14. The system of claim 9, wherein the control device is provided with hard controls for control of a sound volume produced by an audio functionality in the system.

15. The system of claim 9, wherein each respective next one of the lay-outs has a further graphical representation of a return button for return to the preceding higher level, the further graphical representation being uniform throughout the levels with regard to location and appearance.

16. The system of claim 9, wherein each respective lay-out has a further graphical representation of a selectable record button that enables recording through a recording functionality available in the system and that is uniform throughout the levels with regard to location and appearance.

* * * * *